United States Patent [19]

Pizzorno et al.

[11] Patent Number: 4,580,959
[45] Date of Patent: Apr. 8, 1986

[54] MADE TO TIRE-VULCANIZING MOLDS

[75] Inventors: Augusto Pizzorno; Bruno Salvadori, both of Milan, Italy

[73] Assignee: Pirelli Coordinamento Pneumatici S.p.A., Milan, Italy

[21] Appl. No.: 760,535

[22] Filed: Jul. 30, 1985

[30] Foreign Application Priority Data

Aug. 1, 1984 [IT] Italy .................... 22162 A/84

[51] Int. Cl.⁴ .................................... B29H 5/02
[52] U.S. Cl. ................... 425/47; 425/28 R; 425/32; 425/46; 425/195
[58] Field of Search ............ 425/19, 20, 21, 22, 425/23, 24, 25, 28 R, 31, 32, 33, 35, 36, 39, 46, 47, 185, 190, 192 R, 193, 195, 451.9

[56] References Cited

U.S. PATENT DOCUMENTS

| | | | |
|---|---|---|---|
| 1,376,123 | 4/1921 | Stickel | 425/47 |
| 1,906,641 | 5/1933 | Shook | 425/32 |
| 2,198,493 | 4/1940 | Freeman | 425/47 X |
| 2,279,540 | 4/1942 | Voth et al. | 425/36 |
| 2,285,389 | 6/1942 | Bostwick | 425/28 |
| 2,345,838 | 4/1944 | Soderquist | 425/47 |
| 2,916,768 | 12/1959 | Quéré et al. | 425/451.9 |
| 2,923,527 | 2/1960 | Fannen | 425/19 X |
| 3,137,032 | 6/1964 | MacMillan | 425/36 X |
| 3,233,284 | 2/1966 | MacMillan | 425/23 X |
| 3,336,636 | 8/1967 | Soderquist | 425/195 X |
| 3,779,677 | 12/1973 | Greenwood | 425/32 X |
| 3,868,203 | 2/1975 | Turk | 425/40 X |
| 3,910,735 | 10/1975 | Caretta | 425/40 X |
| 4,289,463 | 9/1981 | Le Moullac | 425/47 |
| 4,515,541 | 5/1985 | Salvadori | 425/40 X |

*Primary Examiner*—J. Howard Flint, Jr.
*Attorney, Agent, or Firm*—Birch, Stewart, Kolasch & Birch

[57] ABSTRACT

There is described a tire vulcanizing press, comprising a frame provided with a lower supporting plate for allowing a mold for vulcanizing the tires to rest upon, and an upper plate that is mobile with respect to the lower plate. The mold comprises a lower cheek, an upper cheek that is mobile with respect to the lower cheek, and a series of sectors, that are mobile with respect to an annular-containing element, each of which is radially mobile with respect to the upper cheek. The mold further comprises a connecting means for fixing the lower cheek to the lower plate, and the upper cheek and the annular element to the upper mobile cheek, and which comprises a series of rotating bodies on the lower and upper plates which are actionable from the outer side of the plates with respect to the mold.

8 Claims, 5 Drawing Figures

MADE TO TIRE-VULCANIZING MOLDS

BACKGROUND OF THE INVENTION

The present invention refers to the improvements made in vulcanizing presses for tires and more specifically to improvements for facilitating and for speeding-up the operations for substituting the vulcanizing molds with which these presses are provided.

As already known, a tire-vulcanizing press comprises a frame provided with a lower support plate usually fixed with respect to the floor, which is provided for allowing a vulcanizing mold of the tires to rest upon, and an upper plate that is mobile with respect to the first plate and provided for keeping the mold shut during the vulcanizing phase and for the shifting with respect to the lower plate, for controlling the opening of the mold itself.

A well-known type of tire vulcanizing mold with which the press can be provided, is a centripetal type of mold with sectors that comprises substantially a lower cheek for being connected to the lower plate, an upper cheek that is axially shiftable with respect to the other cheek and a circumferential crown-of-sectors fixed to the upper cheek and hence axially shiftable along with the same but each of which is radially mobile with respect to the upper cheek when under the action of the force transmitted to it by a coupling made between the inclined surfaces made in the sector and on an annular element that holds the crown-of-sectors. The movement of this type of mold requires, on the upper part of the press, not one but two reciprocally shiftable mobile plates and precisely, an upper plate to which the containing-ring for the sectors is fixed, and an intermediate plate to which the upper cheek is fixed.

As for that matter already known to those skilled in the art, apart from being amply illustrated in detail in existing literature and further below in the present description, owing to the effect of the coupling between the inclined surfaces, the relative axial shifting taking place between the two above-mentioned plates, causes the radial shifting of the sectors with respect to the upper cheek. Hence, the vulcanizing mold is connected to the fixed plate and to the two mobile plates, for the purpose of allowing opening and shutting correctly, during the functioning of the press, while the upper cheek and the annular element mentioned above, are connected respectively to an intermediate mobile plate and to the upper plate of the press. Screws, or similar threaded elements, are usually utilized for realizing this connection, and these latter element are inserted into the holes made in the fixed and in the mobile plates of the press and tightened, in correspondance to the threaded holes of the cheeks and of the annular element of the mold, in accordance with those modes that are already known to technicians.

In the above briefly described type of vulcanizing presses, the operations that are necessary for substituting the mold, result in being long-drawn and tedious, while requiring special care and precaution. In fact, for being able to remove the mold from the press, by raising it from the lower plate upon which it rests, it is first and foremost necessary to disconnect the various mold parts, both from the lower plate itself, as well as from the upper plate. For carrying out these operations, it will first be necessary to dispose the press in its open position, and moreover, to provide appropriate security measures against the press shutting accidently, thus having access from the inside of the mold to the screwheads that serve for connecting the lower cheek to the lower plate. Then, following this, it will be necessary to dispose the mold in its shut configuration, to remove the screws that connect the upper cheek and annular element to the upper mobile plate and finally, after having once again raised the mobile plates of the press, it will be necessary to grip the mold, with appropriate means, for raising it and drawing it away from the fixed plate.

Moreover, the previously mentioned operations can be effectuated only after the mold has substantially attained a room-temperature i.e. after a period of time that is sufficiently long enough for allowing the various mold and press parts to cool down, after the termination of the normal work-cycles. This period of time, which can take longer time than that necessary for carrying out the operations of dismantling the mold itself from the press, being added to the period of time required following this for returning the press back to the temperature of exercise, involves a considerable reduction in the output of the machines, especially when these machines are destined for producing a limited series of tires. Hence, it is evident that the operations necessary for substituting the mold in the described type of presses, prove to be rather difficult, while requiring particular precautions, and the time that is needed on the whole from the moment of interrupting the manufacturing of tires on the press until such time as the press itself can resume to manufacture a different type of tire results in being considerably lengthly.

SUMMARY OF THE INVENTION

The purpose of this invention is to realize a vulcanizing press for tires of the type indicated by means of which the drawbacks that were previously mentioned can be eliminated and, in particular,the operation for substituting the vulcanizing molds can be effectuated in a simple way and within much lesser period of time then heretofore experienced in accordance with the present invention there is provided a tire vulcanizing press comprising a frame provided with a lower support plate for allowing one vulcanizing mold for the tires to rest upon, and an upper plate, mobile with respect to the lower plate, for keeping the mold closed during the vulcanizing phase and for shifting it with respect to the lower plate, for controlling the opening and closing of the mold, the mold comprising at least one lower cheek for being fixed to the lower plate and an upper cheek that is mobile with respect to said lower cheek and apt for being connected to the mobile plate. The press is characterized by having a connecting-means for fixing the lower cheek to the fixed plate and the upper cheek to the mobile plate comprising a series of bodies rotatable upon the fixed and mobile plates, which are actionable from the outside of the fixed and mobile plates, each one of which being provided with at least one projecting part for cooperating with a corresponding shoulder made in the lower and upper cheeks subsequent to the rotation of the respective body, in such a way so as to realize an undercut-connection between the projecting part and corresponding shoulder. Quite conveniently, the undercut-connection can be realized by means of having corresponding helix-shaped reciprocally facing surfaces.

The above-mentioned connecting means conveniently comprise a plurality of shafts, rotatable around their own axis, each of the shafts being provided with a head for being inserted into a corresponding perforation in the lower and upper cheeks for cooperating with a shoulder made in correspondence to the perforations, each of the shafts being mechanically connected to other shafts through a transmission that allows for transmitting the rotation of one shaft to the other and at least one of these being provided with an action means for controlling the rotation.

BRIEF DESCRIPTION OF DRAWINGS

In order to further define the device of the present invention, the following illustrations are intended to present, but not limit a more detailed description of the invention while also referring to the FIGURES of the attached drawings, wherein.

DETAILED DESCRIPTION

Figure 1:
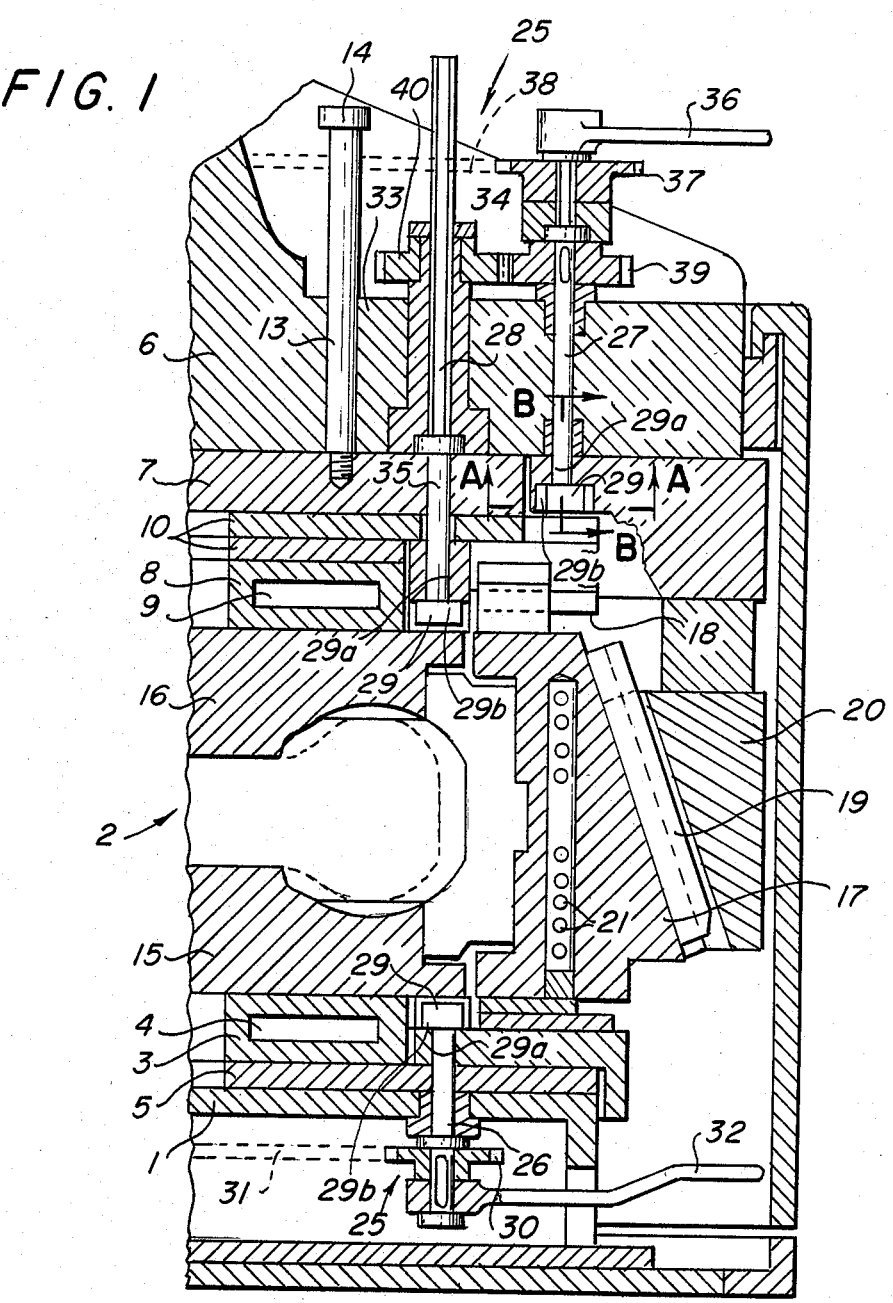
FIG. 1 shows a partial vertical-section of a vulcanizing press according to the present invention, fitted with a centripetal type of mold, in its closed configuration.

With reference to the figures, the vulcanizing press of the present invention substantially comprises a frame having a plate 1 that is fixed with respect to the floor, the plate substantially defining a resting plane for the vulcanizing mold generally designated by the numeral 2. To the fixed plate 1 there can be connected another heating plate 3, in which chambers 4 are made for the vapor, and which are thermally insulated with respect to the above fixed plate, by means of layers 5 made from a suitable thermally insulating material.

On the frame of the press, there is a second mobile plate 6, which is controlled by a kinematic motion (not shown) of any suitable type. To the mobile plate there is connected in an axially mobile way with respect thereto a third plate 7, to which there is fixed a heating element 8, provided with a vapor chamber 9, which rests upon the plate itself, with the interpositioning of the layers 10 made from a suitable thermally insulating material.

The axial shifting of the plate 7 with respect to the plate 6 is controlled by suitable actioning means (not shown) and guided by appropriate shafts 13, each one of which is screwed into the plate 7 and made slidable inside an axial hole of the mobile plate 6, with each shaft presenting a culminating head 14 that acts as a stroke-end stop, in the relative movement between the two plates 6 and 7.

The centripetal type mold 2 interposed between the fixed plate 1 and the mobile plate 6, substantially comprises a lower cheek 15, for being connected (the mode will be explained below) to the fixed plate 1, an upper cheek 16, disposed opposite to the lower cheek and fixed to the plate 7 and also connected to the mobile plate 6, as well as a plurality of sectors 17, circumferentially disposed around the upper cheek, each one of which is radially mobile with respect to the previously mentioned cheeks. For realizing the movement of the sectors with respect to the cheeks and also for controlling the relative shifting, prismatic guides 18 are predisposed for allowing the shifting of the sector itself to take place with respect to the upper cheek 16, and also a coupling 19 between the corresponding inclined surfaces, on the sectors 17, as well as on the radially inner surface of an annular element 20 connected (the mode will be explained below) to the mobile plate 6 of the press.

For convenience sake, inside each sector 17, cavities 21 are provided for the circulation of the heating-fluid, these cavities being capable of being connected with an appropriate source of the fluid, usually a vapor.

On the basis of the instant invention, the connection of the variouis parts of the mold 2 of the annular element 20 to the fixed plate 1, to the mobile plate 6 and to the third plate 7, is realized by a series of bodies that are rotatable on the above plates and actionable from the outside of the plates themselves. As regards the mold, these elements have been indicated, in their whole by the numeral 25. The above connection means comprises substantially three series of shafts that are rotatable around their own axis, indicated by the numerals 26, 27 and 28 respectively. The rotatable shafts 26 of the first series, are rotatable inside holes made in the fixed plate 1. Moreover, each one of these shafts presents a culminating head 29 for example, having prismatic elliptical form (FIG.2a), for being inserted into a perforation 29a endowed with a corresponding shape, that is made in the lower cheek 15 for allowing it to cooperate with a corresponding shoulder 29b, made in the proximity of the perforation itself, as has been shown in FIG. 1 and 2. Each of the shafts can conveniently be provided with a toothed-wheel 30 made solid therewith, and the shafts of the first series can be connected to one another through a chain drive transmission 31. Moreover, one of the shafts themselves can be provided with an opportune actioning means for example, a lever 32, for controlling the rotation that is transmitted to the other shafts of the series through the chain 31.

The shafts of the second series 27 are rotatable on the mobile plates 6 that present a culminating head 29 as well, for being inserted into a corresponding perforation 29a, made in the annular element 20. Each of these heads, that have a similar form to that of the shaftheads of the first series, cooperates with a corresponding shoulder 29b, made in the proximity of each of the previously mentioned perforations that are present in the annular element 20.

The shafts of the third series which are necessary when the press is fitted with the centripetal type of molds, are rotatable on the mobile plate 6 and they are also axially shiftable with respect to it. For this purpose, each shaft is axially slidable in a bush 33 mounted on a plate 6. The shaft comprises a first tract 34 that is axially slidable inside the bush, and a second tract 37 that is lodged, in a rotatable manner, inside a hole made in plate 7. In correspondence to the extremity of the second tract 35, there is made a prismatic head 29 (similar to the previous one), for being inserted into a corresponding perforation 29a made in the upper cheek 16 of the mold 2 and also for cooperating with a shoulder 29b made in the proximity of the perforation itself, as has been clearly shown in FIG. 1.

The blocking between the support plates and the elements connected to it, takes place because the prismatic shaftheads 29 have an elliptical form; whereas, the corresponding perforations in the cheeks and in the annular elements, are constituted by circular chambers having a greater diameter than the maximum diameter of the elliptical heads, which are accessible through an opening of an elliptical section with a slightly larger diameter than that of the corresponding head.

It is clear that a rotation of the shafts around their own axis, takes each head, from a possible sliding-position through the aperture of the corresponding circular chamber (by coincidence of the axes of the two ellipses), to a rotated position with respect to the previous one, whereby sliding is not possible since it results in being blocked by the shoulder comprised by the interference between the elliptical heads and the circular chamber walls, created by the non-coincidence between the axes of the two ellipses. Hence, in such a manner there is provided the blocking or, as an alternative, the releasing between the cheeks of the annular element and the corresponding supporting plates.

A further advantageous feature consists in providing corresponding reciprocally facing surfaces of the circular chamber and of the elliptical head, from the part that issues forth in correspondence to the shaft, not perpendicular to the axis of the shaft but inclined with respect thereto or rather, helix-shaped (as clearly illustrated in FIG. 2b), with the axis of the helix and the shaft being the same. It is clear that, by adopting this provision, the rotation of the elliptical head in the corresponding chambers, as effectuated through the rotation of the shaft, not only causes the blocking of the cheeks and of the ring on the corresponding plates, but also causes a shrinkage between the two elements whose values can be varied, within determined limits, by means of varying the angle of rotation of the shaft, or the inclination of the coupled helicoidal surfaces.

Among the advantages realized through shrinkage, there is obvious that advantage eliminating the effect of all the existing clearances at play between the coupled elements (clearances that are per se necessary for facilitating the mounting and dismantling of the mold from the press) hence, guaranteeing the correct functioning and longer service-life for the machinery, and moreover, reducing the need of the maintenance operations.

Still conveniently, at least one shaft in the second series 27, is provided with an action means for example the lever 36, and to each shaft of the series, there is connected to a toothed-wheel 37 upon which there is disposed a chain 38 for transmitting the motion from one of the shafts to the other shafts of the series. On each shaft 27 of the second series, it is later tallied with a toothed-wheel 39, meshed with corresponding toothed-wheels 40 made solid with the torsion directly or through the means of a bush 33, with a shaft 26 of the third series.

The functioning of the described press takes place in the following manner.

Figure 2B:
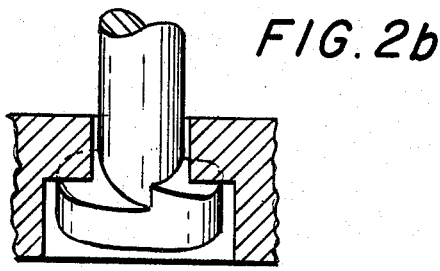
FIG. 2b shows a detail of the same connecting means of FIG. 2a, according to the cutting plane B—B.
Figure 2A:
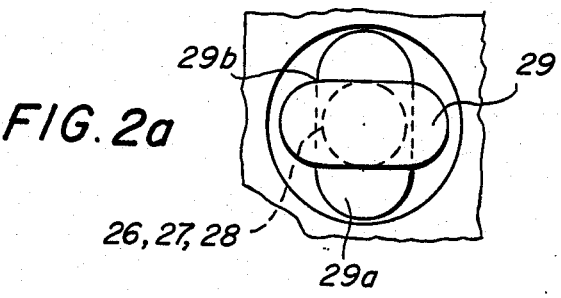
FIG. 2a shows a detail of the connecting means in a blocking position, with which the press of FIG. 1 is provided, as seen along the cutting plane A—A.

When the mold is mounted on the press, each of the prismatic heads 29 are found disposed in the configuration shown in FIGS. 1 and 2 whereby the press cooperates with a corresponding shoulder 29b made in the proximity of the perforations 29a that are seen on the annular element 20 and on the lower and upper cheeks, respectively 15 and 16. In this manner the heads 29 of the shafts 26 of the first series, rigidly connect the lower cheek 15 to the corresponding fixed plate 1 of the press, while the prismatic heads of the shafts 27 and 28, of the second and third series respectively, rigidly connect the annular element 20 to the mobile plate 6, and the upper cheek 16 to the third plate 7 of the press. When the press is brought to its open configuration (shown in FIG. 3), subsequent to the raising of the mobile plate 6, first the radial shifting of the sectors 17 are controlled. This is obtained through the effect of the relative axial movement between the second plate 6 and the third plate 7, owing to the pressures transmitted during the coupling between the inclined surfaces 19, which apply a force to the relative sector 17, whose radial component determines the radial movement towards the outside of the sector itself that is guided during the movement by the guides 18.

Figure 3:
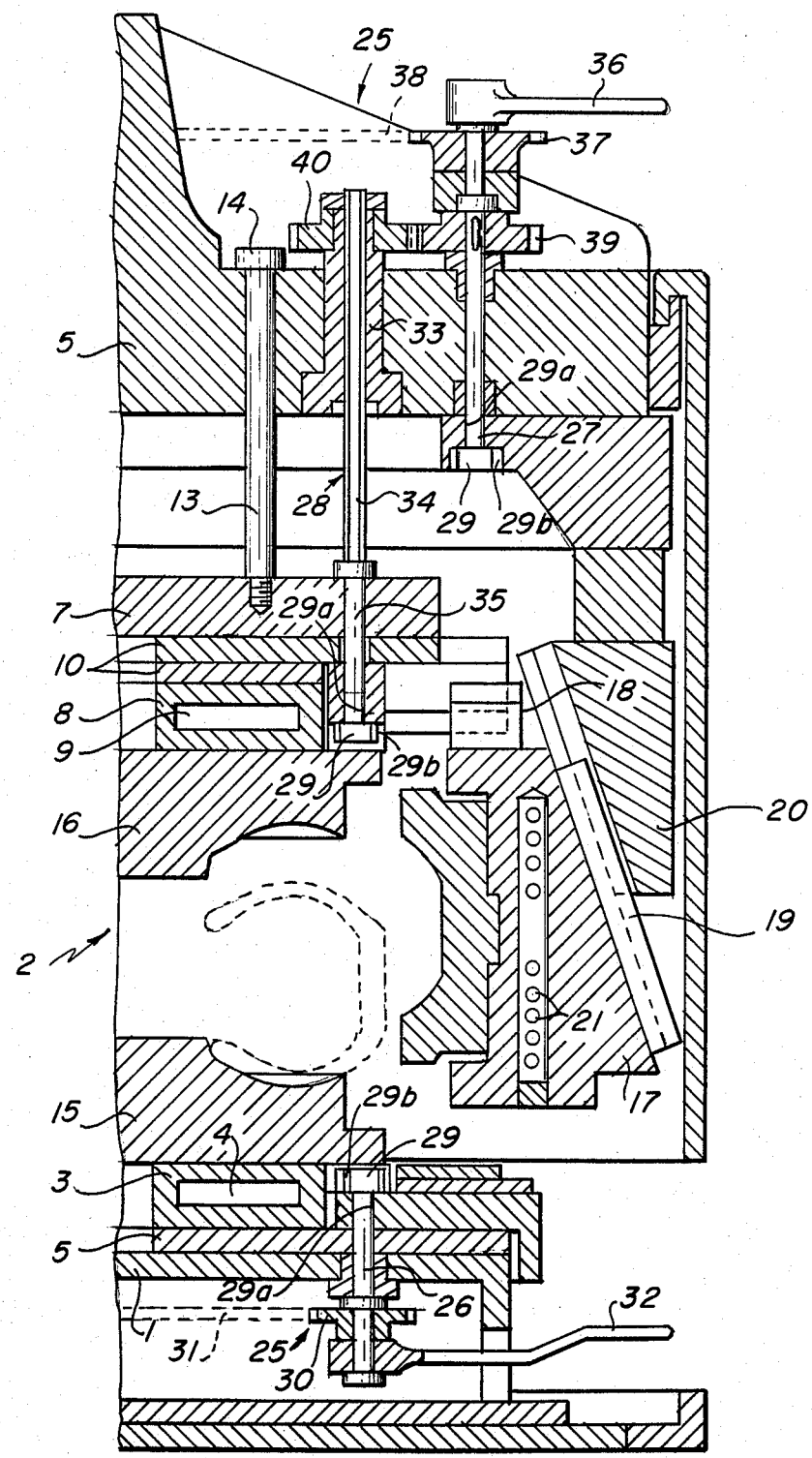
FIG. 3 shows a section of the press in FIG. 1, in an open configuration.

During the phase of opening the mold, the mobile plate 6 separates from the plate 7, in the manner shown in FIG. 3. The relative shifting can take place because the first tract 34 of each shaft 27 of the second series, can slide inside the relative bush 33 and, similarly, each shaft 13 can slide inside the relative hole made in mobile plate 6.

Whenever the mobile plate 6 has reached the stroke-end stop with respect to the plate 7 i.e. against the ledge-head 14 of shaft 13, further movement of the plate 6 causes the upper cheek to be raised and with it the raising of the crown-of-sectors 17, with respect to the lower cheek 15, thus determining (see FIG. 3) the complete opening of the mold.

Figure 4:
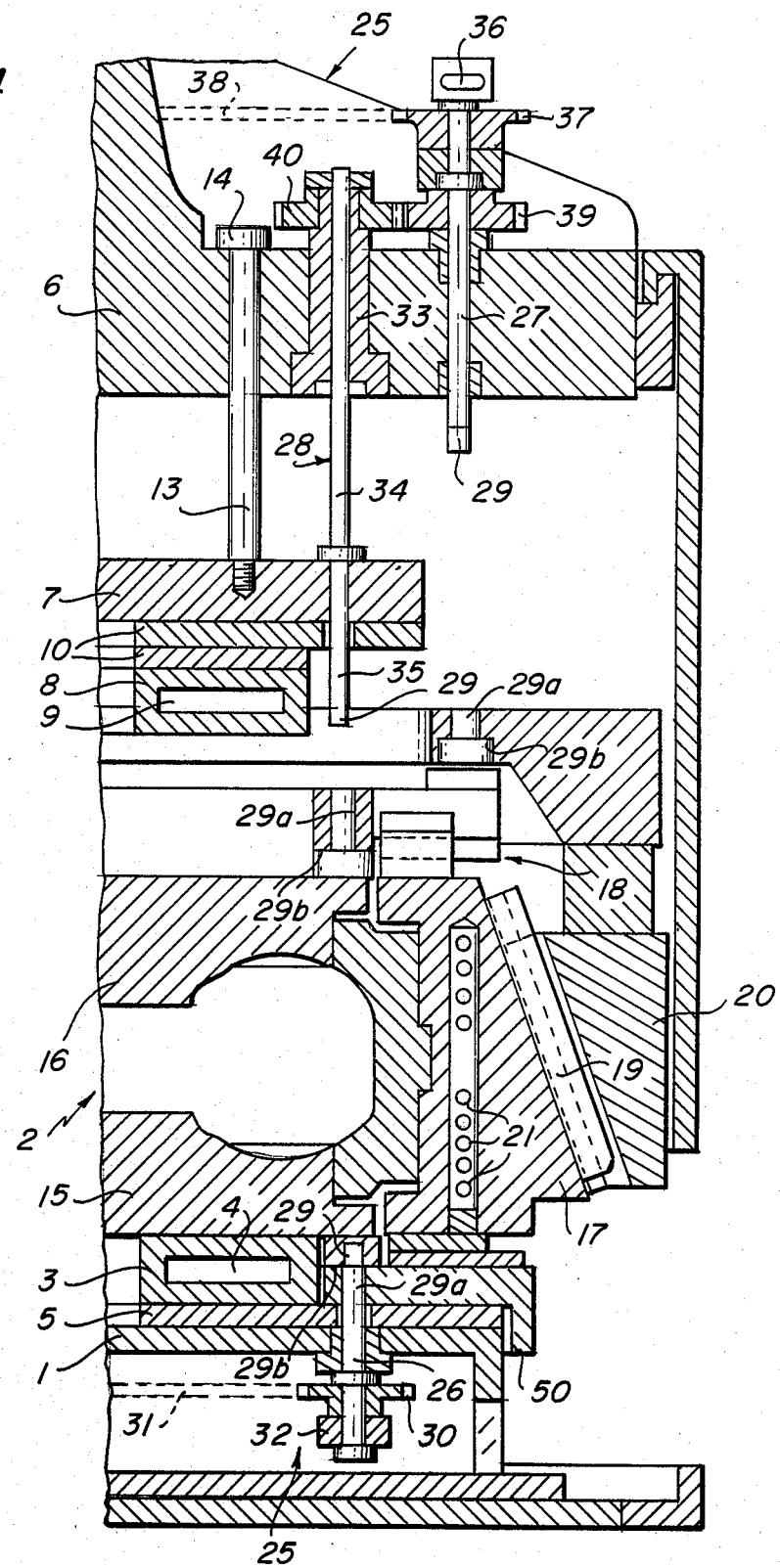
FIG. 4 shows a section of the press, according to the invention, in a configuration whereby its upper plate is separated from the vulcanizing mold ready for being removed from the press itself.

When the mold 2 has to be dismantled from the press, for the purpose of being substituted with a different mold, it is unnecessary to wait for the press and the mold to first cool down substantially to room temperature. The operation of substituting the mold can be started immediately after the termination of the last operative cycle on the press. For proceeding with the substitution, after having extracted the last vulcanized tire and having shut the mold, it is enough for the actioning levers 32 and 36 to be operated for determining the rotation of the relative shafts 26 and 27 to which the levers are connected. The rotation from these shafts is transmitted through the chains 31 and 38 through the pairs of toothed-wheels 39 and 40, to the other shafts of the same series and to the shafts 28 of the third series. In this way the prismatic heads 29 of each shaft are brought to a configuration whereby they are substantially disengaged from the relative shoulders 29b and can pass through the relative perforations 29a made in the annular element 20 and in the lower and upper cheeks 15 and 16 respectively, if any relative axial movement of the shafts themselves, is determined with respect to these parts. Therefore, when the mobile plate 6 of the press is raised (as shown in FIG. 4) the heads 29, of the shafts 27 and 28 of the second and third series, become dis-engaged from the relative perforations 29a made in the annular 20 and in the upper cheek 16 and hence, the plate 6 and 7 can be completely separated from the mold, which remains resting solely upon the fixed plate 1 (as shown in FIG. 4). At this point, the mold can be raised from the plate itself by gripping it in any appropriate way such as, for example, through a device comprising a plurality of hooks (not shown) which may be inserted underneath the lower cheek 15 precisely, in correspondence with the end-limit ledge 50.

When the new mold is made to rest upon the fixed plate 1, by means of fixing it down it is sufficient to lower the mobile plate 6 of the press and to repeat, in the inverse sense, the previously described operations. Hence, the operation substituting the molds on the press of the instant invention can be effected with considerable simplicity and speed. Moreover, during the course of the operations required for substituting the molds, it is unnecessary to have ready any device for taking precautions against risks that could be derived from an accidental lowering of the second plate 6 and/or of the third plate 7.

It is quite obvious that to the form and disposition of the different parts of the press according to the present invention, modifications and alternative variations can be carried out, without going beyond the spirit of the invention itself. In particular, even though the vulcanizing-press having the form as shown and described, should comprise a mold of the centripetal type provided with a lower cheek, an upper cheek and a series of sectors, the invention can also be applied to presses that are equipped with molds made of two-halves comprising solely a pair of cheeks of which the lower one is fixed and the upper one is mobile, for defining the tire cavity, or molds with sectors of a diverse type to that described. In this case, there is no need for having any relative shifting between the plates 6 and 7 so much so that the connecting means 25 described, only comprises two series of rotatable shafts completely corresponding with those of the first series of shafts 26 and the third series of shafts 28 owing exclusively to the blocking of the two cheeks.

Others skilled in the art might have other modifications occur to them based on the changings of the present invention. These modifications are intended to be encompassed within the scope of this invention.

What is claimed is:

1. A tire vulcanizing press comprising in combination a frame providing a lower support plate having one vulcanizing mold for vulcanizing tires therein, and an upper plate, mobile with respect to said lower plate, for keeping said mold closed during the vulcanizing phase and for shifting it with respect to said lower plate for controlling the opening and closing of the mold, said mold comprising at least one lower cheek, for being fixed to said lower plate, and an upper cheek that is mobile with respect to said lower cheek connected to said mobile plate, said press further comprising connecting means for fixing said lower cheek to said fixed plate and said upper cheek to said mobile plate, which comprises a series of bodies rotatable upon said fixed and mobile plates, which are actionable from the outside of said fixed and mobile plates each one of which being provided with at least one projecting part for cooperating with a corresponding shoulder made in said lower and upper cheeks, subsequent to the rotation of said bodies, said bodies comprising a plurality of rotatable shafts and wherein said projecting part comprises a head having a prismatic elliptical form and each shoulder comprises a perforation which is a circular chamber with an opening having an elliptical section that corresponds to that of said head to realize an undercut-connection between said projecting part and said shoulder.

2. The press according to claim 1, said mold further comprising a series of sectors, each one of which is mobile radially with tespect to said upper cheek, under the action of a force transmitted to it by a coupling between an inclined surface made in said sector and an annular element connected to said mobile upper plate, said connecting means connecting said annular element to said mobile plate and including a further series of rotatable bodies on said mobile plate, that are actionable from the outside of said mobile plate, each one of which is provided with at least one projecting part for being made to cooperate with a corresponding shoulder made on said annular element subsequent to the rotation of said bodies, said bodies comprising a plurality of rotatable shafts and wherein said projecting part comprises a head having a prismatic elliptical form and each shouler comprises a perforation which is a circular chamber with an opening having an elliptical section that corresponds to that of said head to realize an undercut connection between said projecting part and said shoulder.

3. The press according to claim 1, wherein each one of said shafts is being mechanically connected with said other shafts through a transmission that allows for transmitting the rotation from one of them to the other, and at least one of them being provided with actioning means apt for controlling their rotation.

4. The press according to claim 1, said mold further comprising an annular element connected to said mobile upper plate, and wherein said connecting means comprises three series of said shafts, the shafts of a first series being rotatable upon said mobile plate, the relative heads being inserted into perforations in said annular element, the shafts of a second series for being inserted into perforations of said upper cheek, said shafts of said first series being connected to each other through a chain-transmission and with the shafts of said second series through a pair of toothed-wheels, and the shafts of a third series being rotatable upon said fixed plate, with relative heads for being inserted into perforations of said lower cheek.

5. The press according to claim 1, wherein said prismatic elliptical heads present their surface turned towards said shaft that is obliquely inclined with respect to an axis of said shaft and that the surface of said circular chamber, that faces said inclined surface, presents the same inclination as the latter.

6. The press according to claim 5, wherein said facing surfaces are helix-shaped with the axis of said helix being coincident with the axis of said shaft.

7. The press according to claim 3, wherein said actioning means comprises a lever, made to rotate solidly with said shaft.

8. The press according to claim 2, wherein said prismatic elliptical heads present their surface turned towards said shaft that is obliquely inclined with respect to an axis of said shaft and that the surface of said circular chamber, that faces said inclined surface, presents the same inclination as the latter.

* * * * *